(12) United States Patent
Suriyanarayanan et al.

(10) Patent No.: US 12,725,161 B2
(45) Date of Patent: Sep. 1, 2026

(54) CONTACTLESS TRANSACTION PROTECTION USING GENERATIVE ADVERSARIAL NETWORK ("GAN") DEEP LEARNING TECHNOLOGY

(71) Applicant: Bank of America Corporation, Charlotte, NC (US)

(72) Inventors: Gowri Sundar Suriyanarayanan, Tamil Nadu (IN); Maneesh Sethia, Telangana (IN); Abhijit Behera, Telangana (IN); Shailendra Singh, Maharashtra (IN); Aiswary R, Tamilnadu (IN); Vignesh A S, Tamilnadu (IN)

(73) Assignee: Bank of America Corporation, Charlotte, NC (US)

( * ) Notice: Subject to any disclaimer, the term of this patent is extended or adjusted under 35 U.S.C. 154(b) by 2 days.

(21) Appl. No.: 18/411,243

(22) Filed: Jan. 12, 2024

(65) Prior Publication Data

US 2025/0232304 A1 Jul. 17, 2025

(51) Int. Cl.

| | |
|---|---|
| ***G06Q 20/40*** | (2012.01) |
| ***G06Q 20/34*** | (2012.01) |
| *H04L 9/40* | (2022.01) |

(52) U.S. Cl.

CPC ....... *G06Q 20/4016* (2013.01); *G06Q 20/352* (2013.01)

(58) Field of Classification Search

None

See application file for complete search history.

(56) References Cited

U.S. PATENT DOCUMENTS

| | | | | |
|---|---|---|---|---|
| 8,256,667 | B2 * | 9/2012 | Poznansky | G06K 19/06206 235/493 |
| 2006/0243798 | A1 * | 11/2006 | Kundu | G07G 3/00 235/383 |
| 2018/0173789 | A1 * | 6/2018 | Llagostera | G06F 16/9024 |

* cited by examiner

*Primary Examiner* — Bennett M Sigmond
*Assistant Examiner* — Bhavin D Shah
(74) *Attorney, Agent, or Firm* — Weiss & Arons LLP

(57) ABSTRACT

Methods, apparatus, and systems for identifying and suspending attempted illegitimate transactions. The methods may include attempting a transaction between a contactless transmitter included in a transaction device and a contactless receiver not included in the transaction device. In response to attempting the transaction, the methods may include generating a real-time synthetic data model at a generator module. The methods may include transmitting the real-time synthetic data model to a discriminator module. The methods may include comparing the real-time synthetic data model to identifiers of authorized contactless receivers stored in a knowledge graph. The methods may include executing a prediction whether the attempted transaction will be a legitimate transaction based on the comparison. The methods may include executing the transaction in response to a prediction that the transaction will be a legitimate transaction and terminating the transaction, in response to a prediction that the transaction will be an illegitimate transaction.

15 Claims, 7 Drawing Sheets

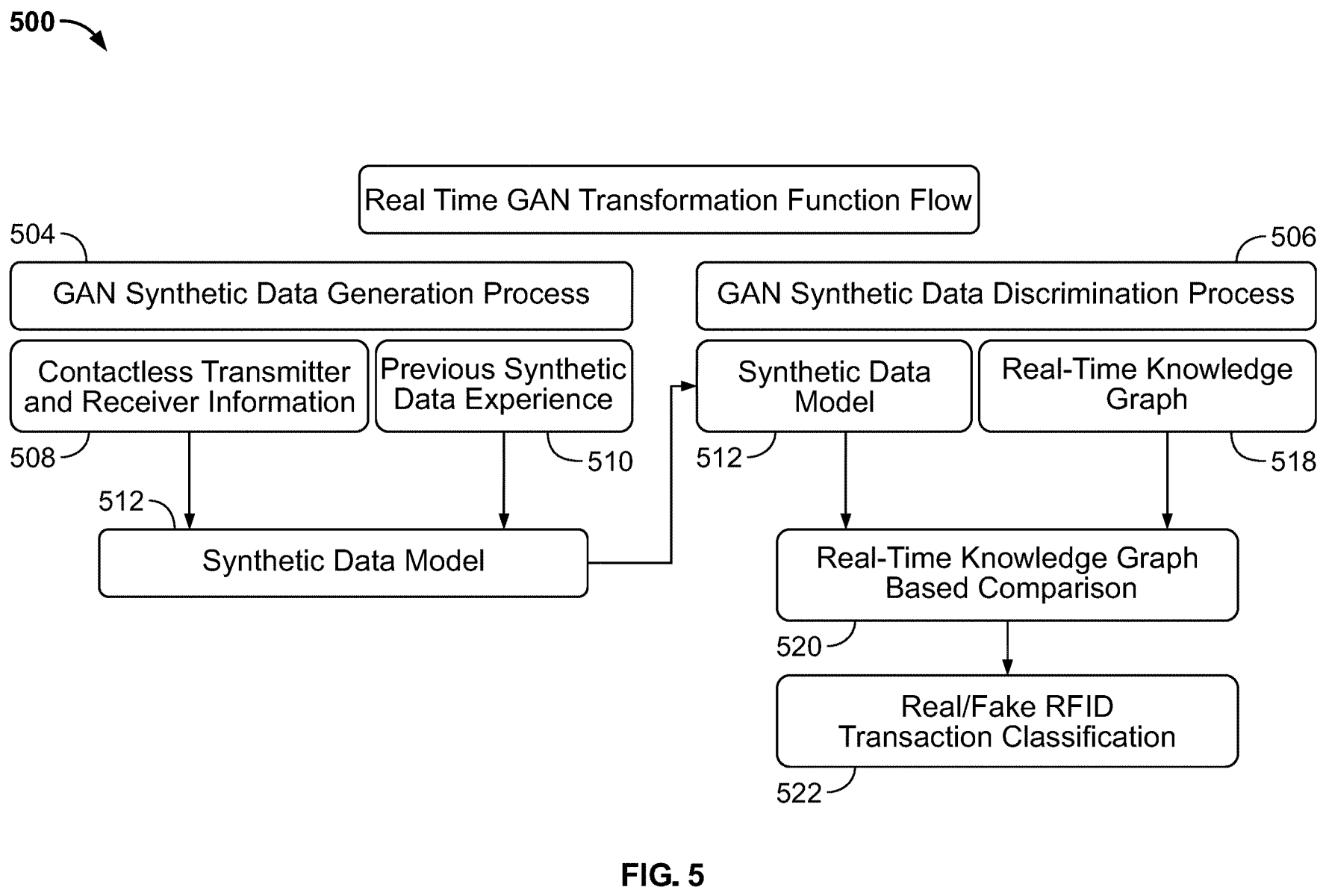

500

Real Time GAN Transformation Function Flow

504 GAN Synthetic Data Generation Process

506 GAN Synthetic Data Discrimination Process

508 Contactless Transmitter and Receiver Information

510 Previous Synthetic Data Experience

512 Synthetic Data Model

512 Synthetic Data Model

518 Real-Time Knowledge Graph

520 Real-Time Knowledge Graph Based Comparison

522 Real/Fake RFID Transaction Classification

FIG. 5

CONTACTLESS TRANSACTION PROTECTION USING GENERATIVE ADVERSARIAL NETWORK ("GAN") DEEP LEARNING TECHNOLOGY

FIELD OF TECHNOLOGY

The field of technology relates to transaction authentication.

BACKGROUND OF THE DISCLOSURE

Contactless cards (i.e., a card that includes contactless capabilities) may be vulnerable to unauthorized contactless readers. Unauthorized contactless readers may read card information from the contactless card and process a transaction using the card information. Therefore, such a processed transaction may be unauthorized. Because the contactless transaction may not involve input of a personal identification number ("PIN"), other forms of authentication are used to prevent unauthorized contactless transactions.

Current authentication solutions to prevent unauthorized contactless transactions typically include enabling a card user to manually switch off the contactless function of the card on a website or mobile application. However, in the event that network connection is not be available, the card user may not be able to switch off the contactless functionality. In the event that a user is unable to switch off the contactless functionality, the card user's contactless card may be subject to unauthorized transactions. An alternative current solution for preventing unauthorized transactions includes using a physical wrapper to stop signal transmission from a transmitter located inside the contactless card. However, at times, card users do not have access to a physical wrapper. Also, some card users find it inconvenient to constantly wrap and unwrap contactless cards.

As such, it may be desirable to provide a system for identifying and suspending attempted transactions between contactless cards and unauthorized contactless readers. It may be further desirable to provide a system that can identify unauthorized contactless readers without input from the user.

SUMMARY OF THE DISCLOSURE

Systems, apparatus and methods for identifying and suspending attempted transactions between contactless transmitters and unauthorized contactless receivers are provided. The methods may include attempting a transaction.

The transaction may be attempted between a contactless transmitter and a contactless receiver. The contactless transmitter may be included in a transaction device. The transaction device may be a smart card. The transaction device may be a smartphone. The transaction device may be a smartwatch. The transaction device may be a crypto-wallet. The transaction device may be any suitable device that enables wireless transactions.

The contactless receiver may be included in a contactless reader. The contactless reader may not be included in the transaction device. The contactless reader may be remote from the transaction device. The contactless reader may be a point of sale ("PoS") device. The contactless reader may be included in an automated teller machine ("ATM"). The contactless reader may be included in a vending machine. The contactless reader may be any suitable reader that enables wireless transactions.

The contactless transaction may be attempted when the contactless transmitter is in a near filed communication ("NFC") region of the contactless reader. When the contactless transmitter is within an NFC region of the contactless receiver, transmission of signals from the contactless transmitter to the contactless receiver may be enabled. The contactless transaction may be attempted using radio frequency identification ("RFID").

In response to an attempted transaction between the contactless transmitter and the contactless receiver, the methods may include receiving a notification of the attempted transaction. The notification may be received at the transaction device. The notification may include an auditory signal, visual signal, predetermined logic sequence, a message including text or any other suitable electronic notifications. In response to receiving notification of the attempted transaction, the methods may include initiating an identification session. The identification session may be initiated on the transaction device.

The identification session may include generating a synthetic data model. The synthetic data model may be a real-time synthetic data model. The synthetic data model may be generated at a generator module. The generator module may be included in the transaction device. The transaction device may include a discriminator module. The generator module and discriminator module may together comprise a generative adversarial network ("GAN"). The generator and discriminator modules may be included in an integrated circuit ("IC"). The IC may be included in the transaction device.

The IC may include a processing unit. The processing unit may provide processing capabilities to the generator and discriminator module. The processing unit may be a central processing unit ("CPU"). The processing unit may be a graphical processing unit ("GPU"). The processing capabilities may be used by the generator and discriminator modules to perform processing and computing functions.

The generator module and the discriminator modules may be artificial intelligence ("AI") modules. The generator module and discriminator module may include neural networks.

The generator and discriminator modules may learn from experience via iterative processing and algorithmic training. The generator and discriminator modules may include progressive learning algorithms. The progressive learning algorithms may ingest data. The progressive learning algorithms may analyze the ingested data. The progressive learning algorithms may analyze the data for correlations and patterns within the data. The progressive learning algorithms may use the analyzed correlations and patterns to make predictions. The generator and discriminator modules may update the progressive learning algorithm based on the predictions curated from the analyzed correlations and patterns. A combination of the data, the predictions and/or the progressive learning algorithm may be used to dynamically program the generator and discriminator modules.

The generator and discriminator modules may include machine learning algorithms. Machine learning algorithms may enable the generator and discriminator modules to learn from experience without specific instructional programming. The generator and discriminator modules may include deep learning algorithms. Deep learning algorithms may utilize neural networks. Neural networks may use interconnected nodes or neurons in a layered structure to analyze data and predict outcomes. The generator and discriminator modules may include natural language processing ("NLP"). NLP may enable the generator module to recognize, analyze, interpret and understand written and/or spoken human language. The generator and discriminator modules may include any other suitable algorithms or components.

The generator module model may receive data. The generator module may receive large amounts of data. The data may be received from different sources. The data may be received from entity specific sources. The data may be received from public sources. The data may be received from private sources. Data that is received from public sources may include information that can be shared, used, reused and/or redistributed without restriction. Data that is received from private sources may include personal, personally identifiable, financial, sensitive or regulated information of a specific person, entity and/or entity operated devices.

The generator module may use the received data to generate artificial data. The generator module may generate artificial data by modifying the received data. The generator module may generate artificial data to test the discriminator module. The discriminator module may identify whether the data received from the generator module is artificial data or real data. The GAN may include a feedback loop. When the discriminator module correctly identifies data from the generator module as being artificial data, the generator module may generate higher-quality artificial data. The higher-quality artificial data may be data that is harder to differentiate from real data. As the generator module increases the quality of the artificial data, the discriminator module may improve its ability to identify artificial data.

The generator module may test and measure the accuracy of the discriminator module. By providing the discriminator module with artificial data of different qualities, the generator module may measure the accuracy of the discriminator module. Based on the accuracy of the identifications of whether data from the generator module is artificial data, the generator module may update the progressive learning algorithm to provide artificial data that is harder to detect. The generator module may improve the identifications of the discriminator module by updating and dynamically changing the artificial data being input into the discriminator module.

Generating the synthetic data model may include receiving a transaction identifier packet at the generator module. The transaction identifier packet may be received from the contactless receiver. The transaction identifier packet may include first data. The first data may include data identifying the contactless receiver. Data identifying the contactless receiver may include a location, a geolocation, an identification number, and any other suitable identifying data of the contactless receiver. The first data may include data relating to the attempted transaction. Data relating to the attempted transaction may include a time of the attempted transaction, an amount of resources attempted to be transferred, a location/geolocation of the attempted transaction and/or any other suitable transaction related data.

Generating the synthetic data model may include using the generator module to retrieve historical data packets. The historical data packets may include second data. The second data may include determinations executed by the discriminator module that determined whether past attempted transactions were legitimate. The second data may include information that the generator module has previously identified as being associated with the contactless reader. The second data may include any other suitable data relating to past predictions.

Generating the synthetic data model may include combining the first and second data to create the synthetic data model. The first and second data may be combined using a progressive learning algorithm included in the generator module. The generator module may transmit the synthetic data model to the discriminator module.

The methods may include executing a prediction. The discriminator module may execute the prediction. The discriminator module may predict whether the attempted transaction will be a legitimate transaction. The discriminator module may receive the synthetic data model. Upon receiving the synthetic data model, the discriminator module may connect to a knowledge graph.

The knowledge graph may represent a network of data. The knowledge graph may store the network of data. The knowledge graph may show connections between the stored network of data. The network of data may include third data. The third data may include identifiers relating to authorized contactless receivers. Identifiers relating to authorized contactless receivers may include a location, a geolocation, an identification number, and any other suitable identifying data of authorized contactless receivers. Authorized contactless receivers may include contactless receivers that have previously been identified by the discriminator module as having attempted legitimate transactions. Authorized contactless receivers may include contactless receivers that have been previously registered and verified by known entities as being legitimate contactless receivers. Authorized contactless receivers may include any suitable contactless receivers that have been identified as authorized.

The knowledge graph may be a dynamically updatable knowledge graph. The knowledge graph may update in real-time. The knowledge graph may be updatable based on predictions executed by the discriminator module. The knowledge graph may be updatable based on predictions executed by a discriminator module on a second transaction device. The knowledge graph may be updatable based on updates from an entity associated with the knowledge graph.

Updating the knowledge graph may include transmitting to the knowledge graph a transaction log relating to the attempted transaction. The transaction log may be transmitted from the discriminator module. The transaction log may be transmitted from the generator module. The transaction log may include records of the transaction identifier packet, the prediction and a determination of whether the transaction was legitimate. The transaction log may be stored at the knowledge graph. Updating the knowledge graph may include updating the third data stored in the knowledge graph based on the transaction log. Based on the updating, if the transaction is a legitimate transaction the knowledge graph may automatically enable future transactions associated with the contactless receiver. Based on the updating, if the transaction is an illegitimate transaction the knowledge graph may automatically terminate future transactions associated with the contactless receiver.

Executing the prediction may include comparing the synthetic data model to the third data. The comparing may include comparing identifiers included the synthetic data model to identifiers included in the third data. The comparing may include determining a comparison score. The comparison score may be determined based on a percentage of identifiers included in the synthetic data model that are identified to match identifiers included in the third data. The higher the comparison score, the greater the percentage of identifiers included in the synthetic data model may be identified to match identifiers included in the third data. Conversely, the lower the comparison score, the smaller the percentage of identifiers included in the synthetic data model may be identified to match identifiers included in the third data.

For example, the synthetic data model may include a location and an associated identification number of a non-authorized contactless receiver that attempted the transaction. The third data may include different locations and associated identification numbers of a plurality of authorized contactless receivers. The discriminator module may compare the location and identification number of the non-authorized contactless receiver to all of the locations and identification numbers of the plurality of authorized contactless receivers. The discriminator module may select an authorized contactless receiver that has a location and identification number that is most similar to the non-authorized contactless receiver. The discriminator module may determine a comparison score based on the percentage of the location and identification number of the non-authorized contactless receiver that is determined to match the location and identification number of the selected authorized contactless receiver.

In response to determining a comparison score, the discriminator module may execute a prediction. The prediction may predict whether the attempted transaction will be a legitimate transaction. The prediction may be based on whether the comparison score is greater than a predetermined comparison score threshold value. The predetermined comparison score threshold value may be a set value. The predetermined comparison score threshold value may be a minimum percentage required in order to predict that a contactless transaction will be a legitimate transaction.

A comparison score that is determined to be lower than the predetermined comparison score threshold value may indicate that the attempted transaction will be an illegitimate transaction. In response to identifying a comparison score that is below the predetermined threshold value, the discriminator module may predict that the attempted transaction will be illegitimate. A comparison score that is determined to be equal or greater that the predetermined comparison score threshold value may indicate that the attempted transaction will be a legitimate transaction. In response to identifying a comparison score that is equal to or above the predetermined threshold value, the discriminator module may predict that the attempted transaction will be legitimate.

The discriminator module may transmit the prediction to the generator module. The methods may include executing the transaction. The transaction may be executed in response to a prediction that the transaction will be a legitimate transaction. The methods may include terminating the transaction. The transaction may be terminated in response to a prediction that the transaction will be an illegitimate transaction. Terminating the attempted transaction may include preventing the transaction from being executed. Terminating the attempted transaction may include disabling the contactless transmitter from transmitting a signal for a predetermined amount of time. Terminating the transaction may include any suitable method for preventing the transaction from being executed.

The generator module may continually train the discriminator module. The generator module may generate a first testing dataset. The first testing dataset may include modified data from attempted transactions included in previous determinations. The data may be modified to turn the data into artificial data. The artificial data may be fake data. The generator module may transmit the first testing dataset to the discriminator module. The discriminator module may execute training predictions. The training predictions may predict whether the data included in the first training dataset will be real or fake data.

The discriminator module may transmit the training predictions to the generator module. The generator module may identify whether the predictions from the discriminator module are accurate. Based on the identification of whether the predictions are accurate, the generator module may assign an accuracy score to the discriminator module. The accuracy score may be determined based on a percentage of correct predictions out of a total number of predictions. The greater the percentage of correct predictions, the generator module may assign a higher accuracy score. The lower the percentage of correct predictions, the generator module may assign a lower accuracy score. Based on the accuracy score, the generator module may dynamically generate a second testing dataset. The second dataset may include modifications to the data that may be different from the modifications made to the first dataset. The data may be modified to further train the discriminator module. In response to identifying a high accuracy score, the second dataset may include modifications that are increasingly harder to detect. In response to identifying a lower accuracy score, the modifications may only include minor changes from the modifications made in the first dataset.

For example, the generator module may modify the identification number of a contactless receiver included in a previous transaction to change the last three digits of the identification number to create artificial data. The generator module may modify the data in any other suitable manner.

In some embodiments methods may include generating the synthetic data model using an alphanumeric pattern. The alphanumeric pattern may include a plurality of numbers, symbols, and/or characters that may be arranged to represent an identifier of the contactless receiver. The alphanumeric pattern may be generated using data included in the transaction identifier packet and the historical data packet.

The methods may further include comparing the alphanumeric pattern associated with the contactless receiver used in the attempted transaction with alphanumeric patterns corresponding to authorized contactless receivers. The alphanumeric identifiers corresponding to authorized contactless receivers may be stored in the third data. The methods may include identifying whether a transaction is legitimate based on whether there is an identified match of the alphanumeric pattern corresponding to the attempted transaction with the alphanumeric patterns stored in the third data.

BRIEF DESCRIPTION OF THE DRAWINGS

The objects and advantages of the invention will be apparent upon consideration of the following detailed description, taken in conjunction with the accompanying drawings, in which like reference characters refer to like parts throughout and in which:

FIG. 5 shows yet another illustrative diagram in accordance with principles of the disclosure;

DETAILED DESCRIPTION OF THE DISCLOSURE

Figure 1:
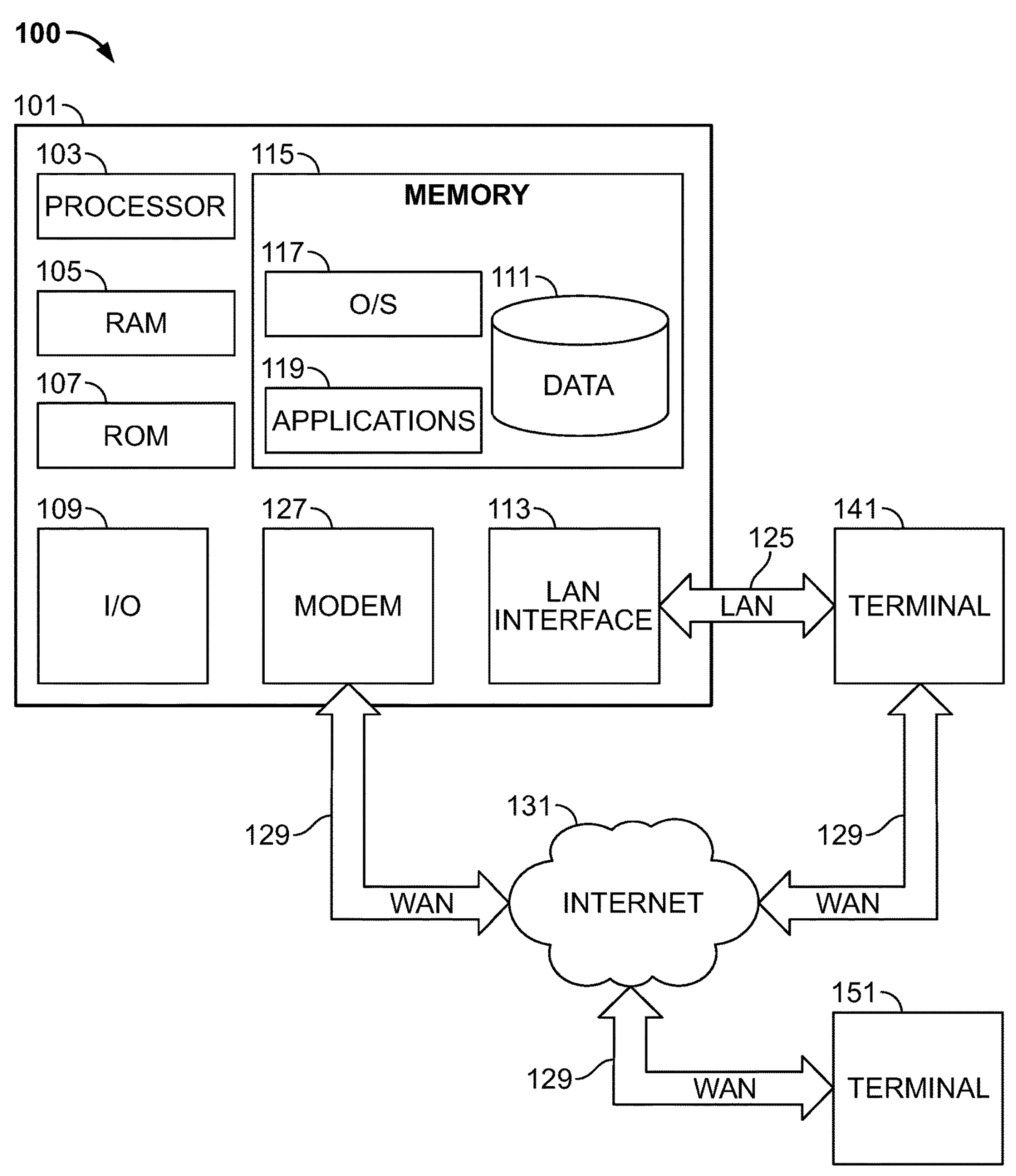
FIG. 1 shows an illustrative diagram in accordance with principles of the disclosure.

Apparatus, methods and systems for identifying and suspending attempted transactions between contactless transmitters and unauthorized contactless receivers are provided. The apparatus may include a transaction device.

The transaction device may be a smartphone, smartwatch, mobile phone, crypto-wallet, radio frequency identification ("RFID") device and/or any other suitable transaction device. The transaction device may include a contactless transmitter. The contactless transmitter may transmit wireless signals. The transaction device may include an integrated circuit ("IC"). The IC may include a generator module and a discriminator module. The generator module and discriminator module may be a generative adversarial network ("GAN").

The IC may include a processing unit. The processing unit may provide processing capabilities to the generator and discriminator modules. The processing unit may be a central processing unit ("CPU"). The processing unit may be a graphical processing unit ("GPU"). The processing unit may be any suitable processing unit. The processing capabilities may be used by the generator and discriminator modules to perform processing and computing functions.

The generator module and the discriminator modules may be artificial intelligence ("AI") modules. The generator module and discriminator module may include neural networks.

The generator and discriminator modules may learn from experience via iterative processing and algorithmic training. The generator and discriminator modules may include progressive learning algorithms. The progressive learning algorithms may ingest data. The progressive learning algorithms may analyze the ingested data. The progressive learning algorithms may analyze the data for correlations and patterns within the data. The progressive learning algorithms may use the analyzed correlations and patterns to make predictions. The generator and discriminator modules may update the progressive learning algorithm based on the predictions curated from the analyzed correlations and patterns. A combination of the data, the predictions and/or the progressive learning algorithm may be used to dynamically program the generator and discriminator modules.

The generator and discriminator modules may include machine learning algorithms. Machine learning algorithms may enable the generator and discriminator modules to learn from experience without specific instructional programming. The generator and discriminator modules may include deep learning algorithms. Deep learning algorithms may utilize neural networks. Neural networks may use interconnected nodes or neurons in a layered structure to analyze data and predict outcomes. The generator and discriminator modules may include natural language processing ("NLP"). NLP may enable the generator module to recognize, analyze, interpret and understand written and/or spoken human language. The generator and discriminator modules may include any other suitable algorithms or components.

The generator module model may receive data. The generator module may receive large amounts of data. The data may be received from different sources. The data may be received from entity specific sources. The data may be received from public sources. The data may be received from private sources. Data that is received from public sources may include information that can be shared, used, reused and/or redistributed without restriction. Data that is received from private sources may include personal, personally identifiable, financial, sensitive or regulated information of a specific person or entity.

The generator module may use the received data to generate artificial data. The generator module may generate artificial data by modifying the received data. The generator module may generate artificial data to test the discriminator module. The discriminator module may identify whether the data is artificial data or real data. The GAN may include a feedback loop. When the discriminator module correctly identifies data from the generator module as being artificial data, the generator module may generate higher-quality artificial data. Higher-quality artificial data may be artificial data that is harder to differentiate from real data. As the generator module increases the quality of the artificial data, the discriminator module may improve its ability to identify the artificial data.

The generator module may test and measure the accuracy of the discriminator module. By providing the discriminator module with the artificial data, the generator module may measure the accuracy of the discriminator module. Based on the accuracy of the identifications of whether the data is artificial data, the generator module may update the progressive learning algorithm to provide artificial data that is harder to detect. The generator module may improve the identifications of the discriminator module by updating and dynamically changing the artificial data being input into the discriminator module.

A contactless receiver may attempt a transaction with the contactless transmitter. The attempted transaction may be attempted through radio frequency identification ("RFID") transmission. The contactless receiver may not be included in the transaction device. The contactless receiver may be remote from the transaction device. The contactless receiver may be included in a contactless reader. The contactless reader may be a point of sale ("PoS") device, an automated teller machine ("ATM"), included in a vending machine and/or any suitable reader that enables wireless transactions.

In response to identifying the attempted transaction, the generator module may receive a transaction identifier packet from the contactless receiver. The packet may include first data. The first data may include identifying data associated with the contactless receiver. The identifying data may include data such as a time of the transaction, a location of the contactless receiver, an identification number associated with the contactless receiver, and any other suitable identifying data relating to the contactless receiver. The first data may include any suitable data relating to the transaction device, the contactless receiver and/or the attempted transaction.

The generator module may retrieve a historical data packet. The historical data packet may include second data. The second data may include determinations executed by the discriminator module that determined whether past attempted transactions were legitimate. The second data may include any suitable historical data.

The generator module may generate a synthetic data model. The synthetic data model may be a real-time synthetic data model. The synthetic data model may be generated using a combination of the first and second data. The combination may be a randomly generated combination. The combination may be generated by one of the progressive learning algorithms.

The generator module may transmit the synthetic data model to the discriminator model. The discriminator module may receive the synthetic data model. The discriminator model may connect to a knowledge graph.

The knowledge graph may represent a network of data. The knowledge graph may store the network of data. The knowledge graph may show connections between the stored network of data. The network of data may include third data. The third data may include identifiers relating to authorized contactless receivers. Identifiers relating to authorized contactless receivers may include a location, a geolocation, an identification number, and any other suitable identifying data of authorized contactless receivers. Authorized contactless receivers may include contactless receivers that have previously been identified by the discriminator module as having attempted legitimate transactions. Authorized contactless receivers may include contactless receivers that have been previously registered and verified by known entities as being a legitimate contactless receiver. Authorized contactless receivers may include any suitable authorized contactless receiver.

The knowledge graph may be a dynamically updatable knowledge graph. The knowledge graph may update in real-time. The knowledge graph may be updatable based on predictions executed by the discriminator module. The knowledge graph may be updatable based on predictions executed by a discriminator module on a second transaction device. The knowledge graph may be updatable based on updates from an entity associated with the knowledge graph. The knowledge graph may be updatable by any suitable update methods.

Updating the knowledge graph may include transmitting to the knowledge graph a transaction log relating to the attempted transaction. The transaction log may be transmitted from the discriminator module. The transaction log may be transmitted from the generator module. The transaction log may be transmitted from both the generator and discriminator module. The transaction log may include records of the transaction identifier packet, the associated prediction and a determination of whether the transaction was legitimate. The transaction log may be stored at the knowledge graph. Updating the knowledge graph may include updating the third data stored in the knowledge graph based on the transaction log. Based on the updating, if the transaction is a legitimate transaction the knowledge graph may automatically enable future transactions associated with the contactless receiver. Based on the updating, if the transaction is an illegitimate transaction the knowledge graph may automatically terminate future transactions associated with the contactless receiver.

The discriminator module may determine a comparison score based on a percentage of identifiers included in the synthetic data model that matches identifiers included in the third data. The discriminator module may execute a prediction whether the attempted transaction will be a legitimate transaction. The prediction may be based on whether the comparison score is greater than a predetermined comparison score threshold value. In response to a determination that the comparison score is greater than the predetermined comparison score threshold value, the transaction may be determined to be legitimate. In response to determining that the transaction is legitimate the discriminator module may predict that the contactless receiver will be a legitimate contactless receiver. In response to a determination that the comparison score is less than the predetermined comparison score threshold value, the transaction may be determined to be illegitimate. In response to determining that the transaction is illegitimate the discriminator module may predict that the contactless receiver will be an illegitimate contactless receiver.

The discriminator module may transmit the prediction to the transaction device. In response to a prediction that the attempted transaction will be a legitimate transaction, the transaction device may execute the attempted transaction. In response to a prediction that the attempted transaction will be an illegitimate transaction, the transaction device may terminate the attempted transaction. Terminating the transaction may include disabling the contactless transmitter from transmitting a signal for a predetermined amount of time. Terminating the transaction may include any suitable method for preventing execution of the transaction.

The generator module may continually train the discriminator module. The generator module may generate a first testing dataset. The first testing dataset may include unmodified data from attempted transactions included in previous determinations. The first testing dataset may include modified data from attempted transactions included in previous determinations. The data may be modified to turn the data into artificial data. The artificial data may be fake data. The generator module may transmit the first testing dataset to the discriminator module. The discriminator module may execute training predictions. The training predictions may predict whether the data included in the first training dataset will be real or fake data.

The discriminator module may transmit the training predictions to the generator module. The generator module may identify whether the predictions from the discriminator module are accurate. Based on the identification whether the predictions are accurate, the generator module may assign an accuracy score to the discriminator module. The accuracy score may be determined based on a percentage of correct predictions out of a total number of predictions. The greater the percentage of correct predictions, the accuracy score assigned to the discriminator module may be higher. The lower the percentage of correct predictions, the accuracy score assigned to the discriminator module may be lower. Based on the accuracy score, the generator module may dynamically generate a second testing dataset including modifications to the data that are different from the modifications made to the first dataset. The data may be further modified to further train the discriminator module. In response to identifying a high accuracy score, the second dataset may include modifications that are increasingly harder to detect. In response to identifying a lower accuracy score, the modifications may only include minor changes from the modifications made in the first dataset.

In some embodiments the generator may generate the synthetic data model using an alphanumeric pattern. The alphanumeric pattern may include a plurality of numbers, symbols and/or characters arranged to represent an identifier of the contactless receiver. The alphanumeric pattern may be generated using data included in the transaction identifier packet and the historical data packet. The methods may further include comparing the alphanumeric pattern associated with the contactless receiver used in the attempted transaction with alphanumeric patterns corresponding to authorized contactless receivers. The alphanumeric identifiers corresponding to authorized contactless receivers may be stored in the third data. The methods may include identifying whether a transaction is legitimate based on whether there is an identified match of the alphanumeric pattern corresponding to the attempted transaction with the alphanumeric patterns stored in the third data.

The transaction device may define a geographic area. The geographic area may be an area in which the contactless transmitter in the transaction device may be able to transmit signals to other transaction devices located within the geographic area. Transaction devices that are located within the geographic area may be considered as being in proximity to the transaction device included in the attempted transaction. In response to determining that contactless reader included in the attempted transaction is a legitimate contactless reader, the transaction device may transmit an authorization message to the other transaction devices located with the geographic area. The authorization message may notify the other transaction devices that the contactless reader is an authorized contactless reader. In response to determining that contactless reader included in the attempted transaction is an illegitimate contactless reader, the transaction device may transmit a warning message to the other transaction devices located with the geographic area. The warning message may notify the other transaction devices that the contactless reader is a non-authorized contactless reader.

Illustrative method steps may be combined. For example, an illustrative method may include steps shown in connection with another illustrative method.

The steps of methods may be performed in an order other than the order shown or described herein. Embodiments may omit steps shown or described in connection with illustrative methods. Embodiments may include steps that are neither shown nor described in connection with illustrative methods.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smart phone, or any other suitable computing device. Elements of system 100, including computer 101, may be used to implement various aspects of the systems and methods disclosed herein. Each of the transaction devices, contactless reader, generator modules, discriminator modules, knowledge graphs and any other part of the disclosure may include some or all of apparatus included in system 100.

Computer 101 may have a processor 103 for controlling the operation of the device and its associated components and may include Random Access Memory ("RAM") 105, Read Only Memory ("ROM") 107, input/output circuit 109 and a non-transitory or non-volatile memory 115. Machine-readable memory may be configured to store information in machine-readable data structures. The processor 103 may also execute all software executing on the computer—e.g., the operating system and/or voice recognition software. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application(s) 119 along with any data 111 needed for the operation of the system 100. Memory 115 may also store videos, text and/or audio assistance files. Transaction devices, contactless readers, generator modules, discriminator modules, knowledge graphs and any other suitable computing devices as disclosed herein may have one or more features in common with Memory 115. The data stored in Memory 115 may also be stored in cache memory, or any other suitable memory.

Input/output ("I/O") module 109 may include connectivity to a microphone, keyboard, touch screen, mouse and/or stylus through which input may be provided into computer 101. The input may include input relating to cursor movement. The input/output module may also include one or more speakers for providing audio output and a video display device for providing textual, audio, audiovisual and/or graphical output. The input and output may be related to computer application functionality.

System 100 may be connected to other systems via a local area network ("LAN") interface 113. System 100 may operate in a networked environment supporting connections to one or more remote computers, such as terminals 141 and 151. Terminals 141 and 151 may be personal computers or servers that include many or all of the elements described above relative to system 100. When used in a LAN networking environment, computer 101 is connected to LAN 125 through a LAN interface or adapter 113. When used in a Wide Area Network ("WAN") networking environment, computer 101 may include a modem 127 or other means for establishing communications over WAN 129, such as Internet 131. Connections between System 100 and Terminals 151 and/or 141 may be used for the communication between different nodes and systems within the disclosure.

It will be appreciated if the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface ("API"). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may be configured to store the data in cache memory, the hard drive, secondary memory, or any other suitable memory.

Additionally, application program(s) 119, which may be used by computer 101, may include computer executable instructions for invoking functionality related to communication, such as e-mail, Short Message Service ("SMS") and voice input and speech recognition applications. Application program(s) 119 (which may be alternatively referred to herein as "plugins," "applications," or "apps") may include computer executable instructions for invoking functionality related to performing various tasks. Application programs 119 may utilize one or more algorithms that process received executable instructions, perform power management routines or other suitable tasks. Application programs 119 may utilize one or more decisioning processes.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc. that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage and process data (e.g., "cloud computing" and/or "fog computing").

Any information described above in connection with data 111 and any other suitable information, may be stored in memory 115. One or more of applications 119 may include one or more algorithms that may be used to implement features of the disclosure comprising the transmission, storage, and transmitting of data and/or any other tasks described herein.

The invention may be described in the context of computer-executable instructions, such as applications 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered for the purposes of this application, as engines with respect to the performance of the particular tasks to which the programs are assigned.

Computer 101 and/or terminals 141 and 151 may also include various other components, such as a battery, speaker and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 151 and/or terminal 141 may be portable devices such as a laptop, cell phone, tablet, smartphone, or any other computing system for receiving, storing, transmitting and/or displaying relevant information. Terminal 151 and/or terminal 141 may be one or more data sources or a calling source. Terminals 151 and 141 may have one or more features in common with apparatus 101. Terminals 115 and 141 may be identical to system 100 or different. The differences may be related to hardware components and/or software components.

The invention may be operational with numerous other general purpose or special purpose computing system environments or configurations. Examples of well-known computing systems, environments and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices and the like.

Figure 2:
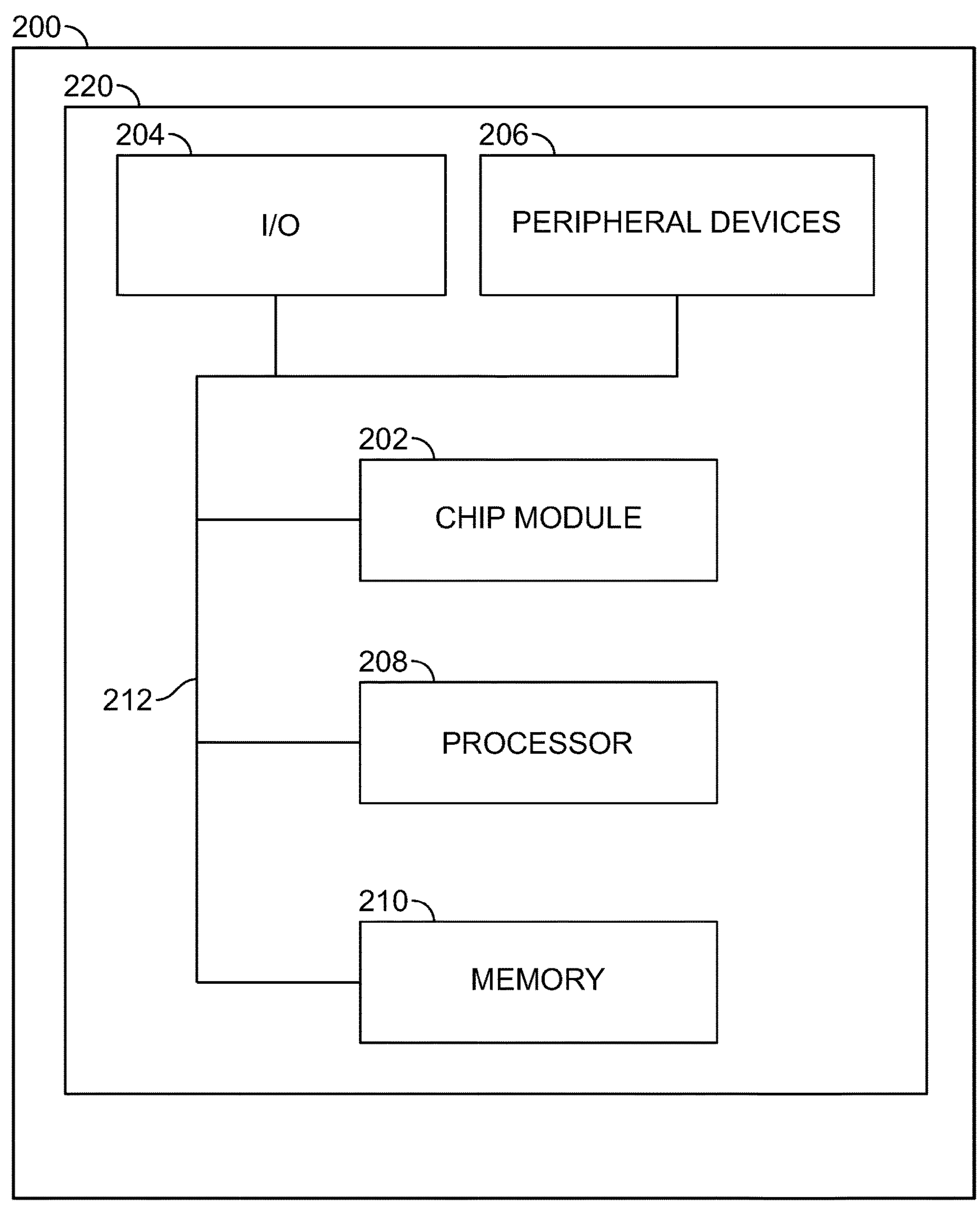
FIG. 2 shows another illustrative diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
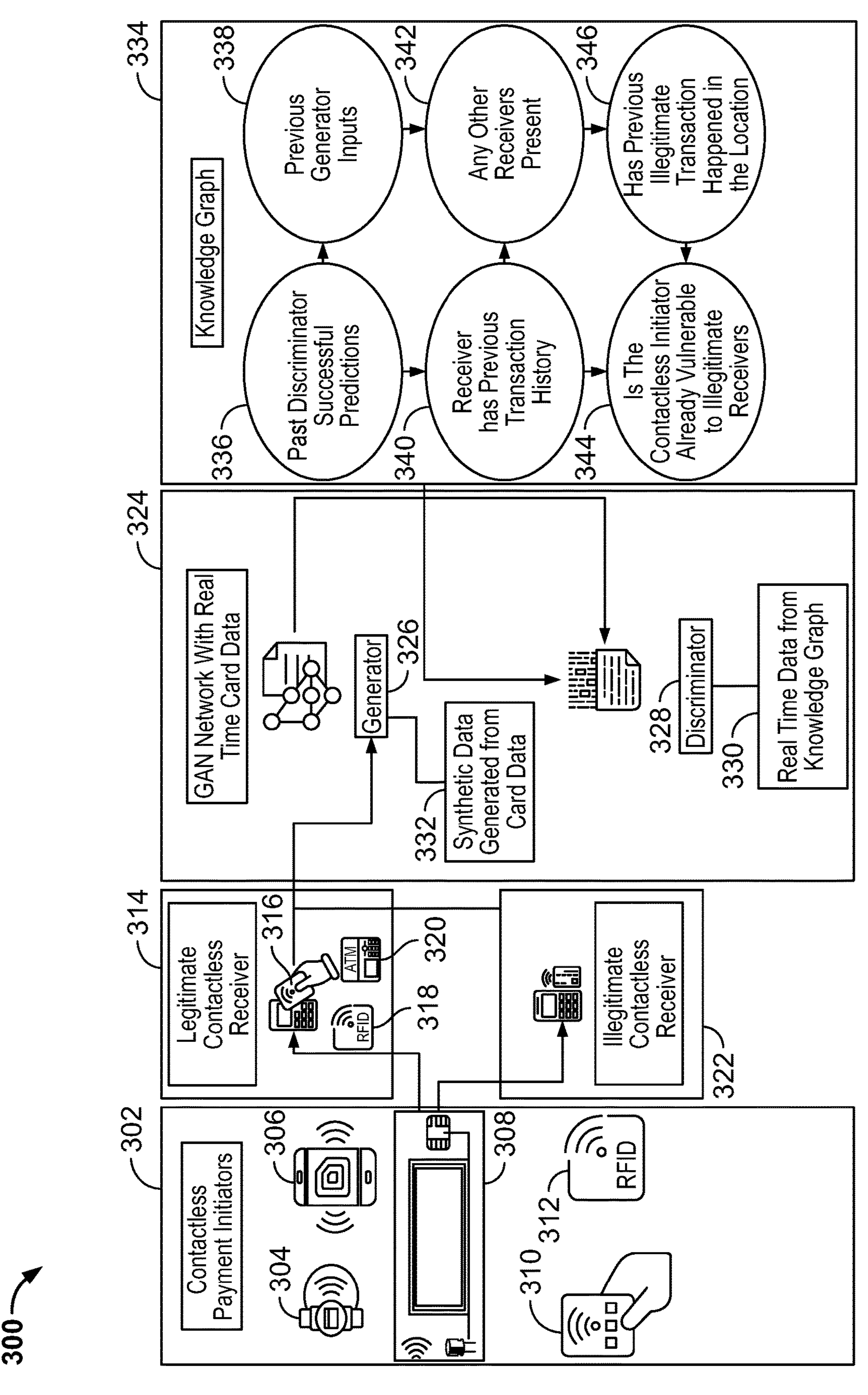
FIG. 3 shows yet another illustrative diagram in accordance with principles of the disclosure.

FIG. 3 shows illustrative transaction process 300. Transaction process 300 may include contactless payment initiators 302. Contactless payment initiators 302 may include transaction devices such as smartwatch 304, mobile phone 306, smart card 308, crypto-wallet 310, radio frequency identification ("RFID") device 312 and/or any other suitable transaction device. Each of contactless payment initiators 302 may include a contactless transmitter.

One of contactless payment initiators 302 may attempt a transaction with a contactless reader. The contactless reader may be included in legitimate contactless receivers 314. Legitimate contactless receivers 314 may include point of sale ("PoS") reader 316, automated teller machine ("ATM") reader 320, RFID reader 318 and/or any other suitable contactless reader. Each contactless receiver included in legitimate contactless receivers 314 may be included in a contactless reader.

The contactless reader may be included in illegitimate contactless receivers 322. Illegitimate contactless receivers 322 may include contactless readers like POS reader 316, ATM reader 320, and RFID reader 318. Contactless payment initiators 302 may be unable to identify whether a contactless reader is part of legitimate contactless receivers 314 or part of illegitimate contactless receivers 322 before attempting the transaction.

Once signals are transmitted between a contactless transmitter of one of contactless payment initiators 302 and a contactless receiver of a contactless reader, data relating to the attempted transaction may be transmitted to general adversarial network ("GAN") 324.

GAN 324 may include generator module 326 and discriminator module 328. Once a transaction is attempted, data relating to the contactless transaction may be transmitted to generator module 326. Generator module 326 may use the data in addition to historical data (not shown) to generate synthetic data 332. Generator module 326 may transmit synthetic data 332 to discriminator module 328. Discriminator module 328 may use synthetic data 332 to predict whether the attempted transaction will be a legitimate transaction or an illegitimate transaction.

Upon receiving synthetic data 332 from generator module 326, discriminator module 328 may connect to knowledge graph 334. Discriminator module 328 may receive real-time data 330 from knowledge graph 334.

Knowledge graph 334 may represent a network of identifiers relating to previously authorized contactless receivers. Knowledge graph 334 may include data 336. Data 336 may include data relating to previous successful predictions from discriminator module 328. Knowledge graph 334 may include data 338. Data 338 may include data relating to previous inputs to generator module 326. Knowledge graph 334 may include data 340. Data 340 may include transaction histories of authorized receivers. Knowledge graph 334 may include data 342. Data 342 may include data relating to any other contactless receivers present within a predetermined geographic location. Knowledge graph 334 may include data 344. Data 344 may include data relating to the transaction device. Knowledge graph 334 may include data 346. Data 346 may include data relating to previous transactions in the location of the attempted transaction. Knowledge graph 334 may include any other suitable data, relating to contactless transmitters, receivers and/or transactions.

Discriminator module 328 may compare identifiers of the attempted transaction with identifiers stored in data 336, 338, 340, 342, 344, and 346 included in knowledge graph 334. Discriminator module 328 may predict whether the attempted transaction is a legitimate transaction using the data identified from knowledge graph 334.

Figure 4:
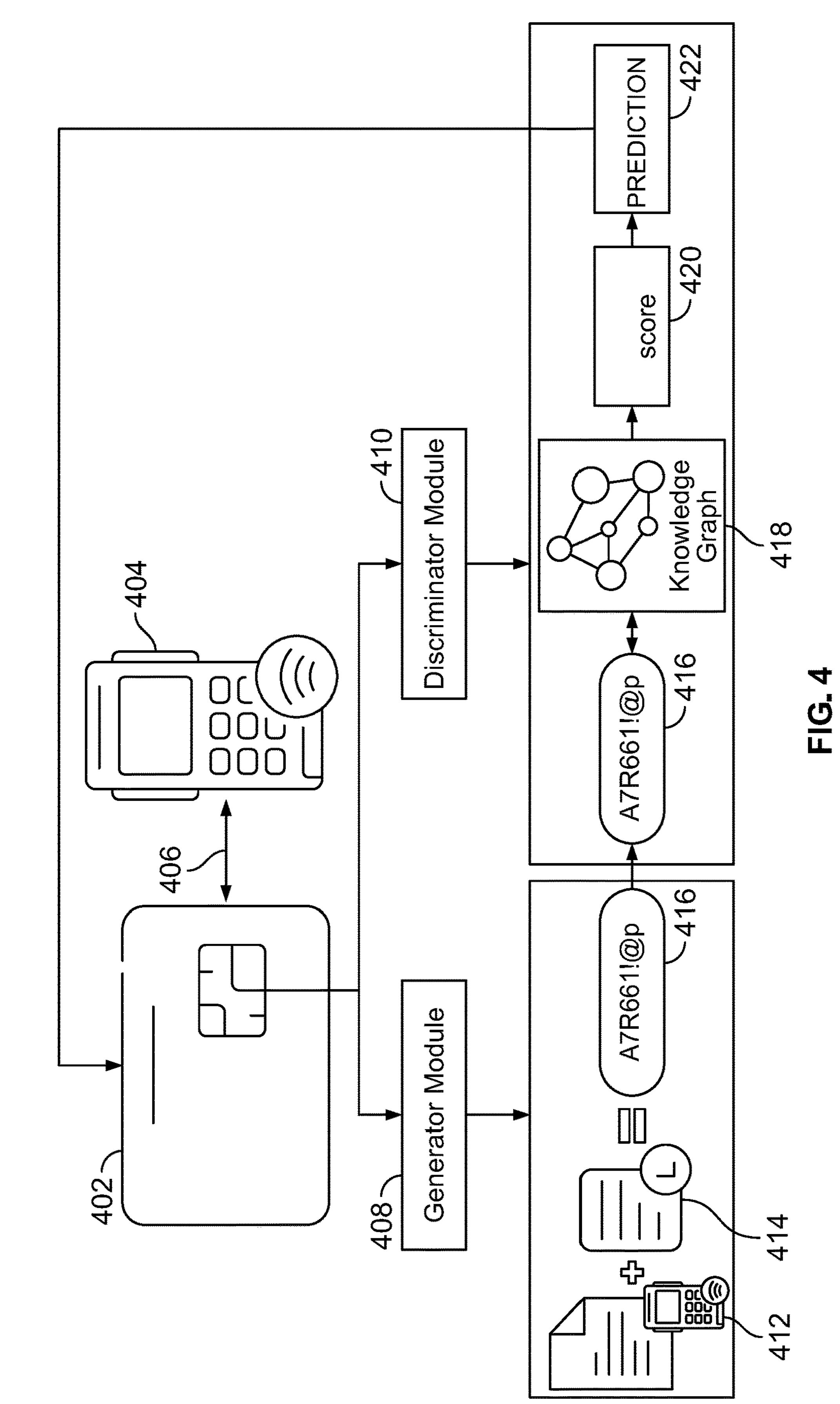
FIG. 4 shows yet another illustrative diagram in accordance with principles of the disclosure.

FIG. 4 shows illustrative transaction process 400. Transaction process 400 may include one or more features in common with transaction process 300. Transaction process 400 may include attempted transaction 406. Attempted transaction 406 may be attempted between contactless transmitter 402 and contactless receiver 404. Contactless transmitter 402 may be included in transaction device. Contactless receiver 404 may be included in a contactless reader.

The transaction device may include generator module 408 and discriminator module 410. Generator module 408 and discriminator module 410 may together comprise a GAN.

In response to attempting the transaction, transaction identifier packet 412 may be transmitted to generator module 408. Transaction identifier packet 412 may include identifiers relating to attempted transaction 406. Identifiers may include a time of attempted transaction 406, a location and/or geolocation of contactless receiver 404, an identification number of contactless receiver 404 and/or any other suitable transaction identifiers.

In response to receiving transaction identifier packet 412, generator module 408 may retrieve historical data packet 414. Historical data packet 414 may include data relating to previous predictions and/or any other suitable historical data. Generator module 408 may use data from transaction identifier packet 412 and historical data packet 414 to generate synthetic data model 416. Synthetic data model 416 may include a pattern created from combination of numbers, characters and/or symbols. For example, a synthetic data model may include the following alphanumeric pattern, "A7R661!@P." The alphanumeric pattern may be generated using identifiers included in transaction identifier packet 412 and historical data packet 414. The alphanumeric pattern may be generated using one or more of the machine learning algorithms included in the GAN.

Generator module 408 may transmit synthetic data model 416 to discriminator module 410. Generator module 408 may transmit synthetic data model 416 to discriminator module 410 to authenticate attempted transaction 406. Discriminator module 410 may connect to knowledge graph 418. Knowledge graph 418 may include a plurality of synthetic data models relating to a plurality of previously authorized contactless readers. Discriminator module 410 may compare synthetic data model 416 with the plurality of synthetic data models included in knowledge graph 418. After comparing synthetic data model 416 with the plurality of synthetic data models included in knowledge graph 418, discriminator module 410 may output comparison score 420. Comparison score 420 may reflect a percentage of synthetic data model 416 that is determined to match a selected synthetic data model from the plurality of synthetic data models included in knowledge graph 418. Based on comparison score 420, discriminator module 410 may execute prediction 422.

For example, in response to a determination that comparison score 420 is greater than a predetermined threshold comparison value, discriminator module 410 may predict that attempted transaction 406 is a legitimate transaction. In response to predicting that attempted transaction 406 is a legitimate transaction, contactless receiver 404 may be identified as a legitimate contactless reader. Alternatively, in response to a determination that comparison score 420 is less than the predetermined threshold comparison value, discriminator module 410 may predict that attempted transaction 406 is an illegitimate transaction. In response to predicting that attempted transaction 406 is an illegitimate transaction, contactless receiver 404 may be identified as an illegitimate contactless reader.

FIG. 5 shows illustrative diagram of transaction process 500. Transaction process 500 may have one or more features in common with transaction processes 300 and 400. GAN synthetic data generation process 504 may be initiated in response to an attempted transaction. GAN synthetic data generation process 504 may begin by receiving contactless receiver and transmitter information 508. GAN synthetic data generation process 504 may then proceed by retrieving previous synthetic data experience 510. GAN synthetic data generation process 504 may then use contactless receiver and transmitter information 508 and previous synthetic data experience 510 to generate synthetic data model 512. GAN synthetic data generation process 504 may include transmitting synthetic data model 512 to GAN synthetic data discrimination process 506.

GAN synthetic data discrimination process 506 may first include receiving synthetic data model 512. Then GAN synthetic data discrimination process 506 may include connecting to real-time knowledge graph 518. Once connected to real-time knowledge graph 518, GAN synthetic data discrimination process 506 may include real-time knowledge graph-based comparison 520. Real-time knowledge graph-based comparison 520 may include comparing synthetic data model 512 to data relating to previously authorized transactions stored in real-time knowledge graph 518. Based on real-time knowledge graph-based comparison 520, GAN synthetic data discrimination process 506 may include real/fake RFID transaction classification 522. If synthetic data model 512 matches identifiers included in real-time knowledge graph 518, real/fake RFID transaction classification 522 may predict that the attempted transaction is a real transaction. In response to a determination that synthetic data model 512 does not match any identifiers included in real-time knowledge graph 518, real/fake RFID transaction classification 522 may predict that the attempted transaction is a fake transaction.

Figure 6:
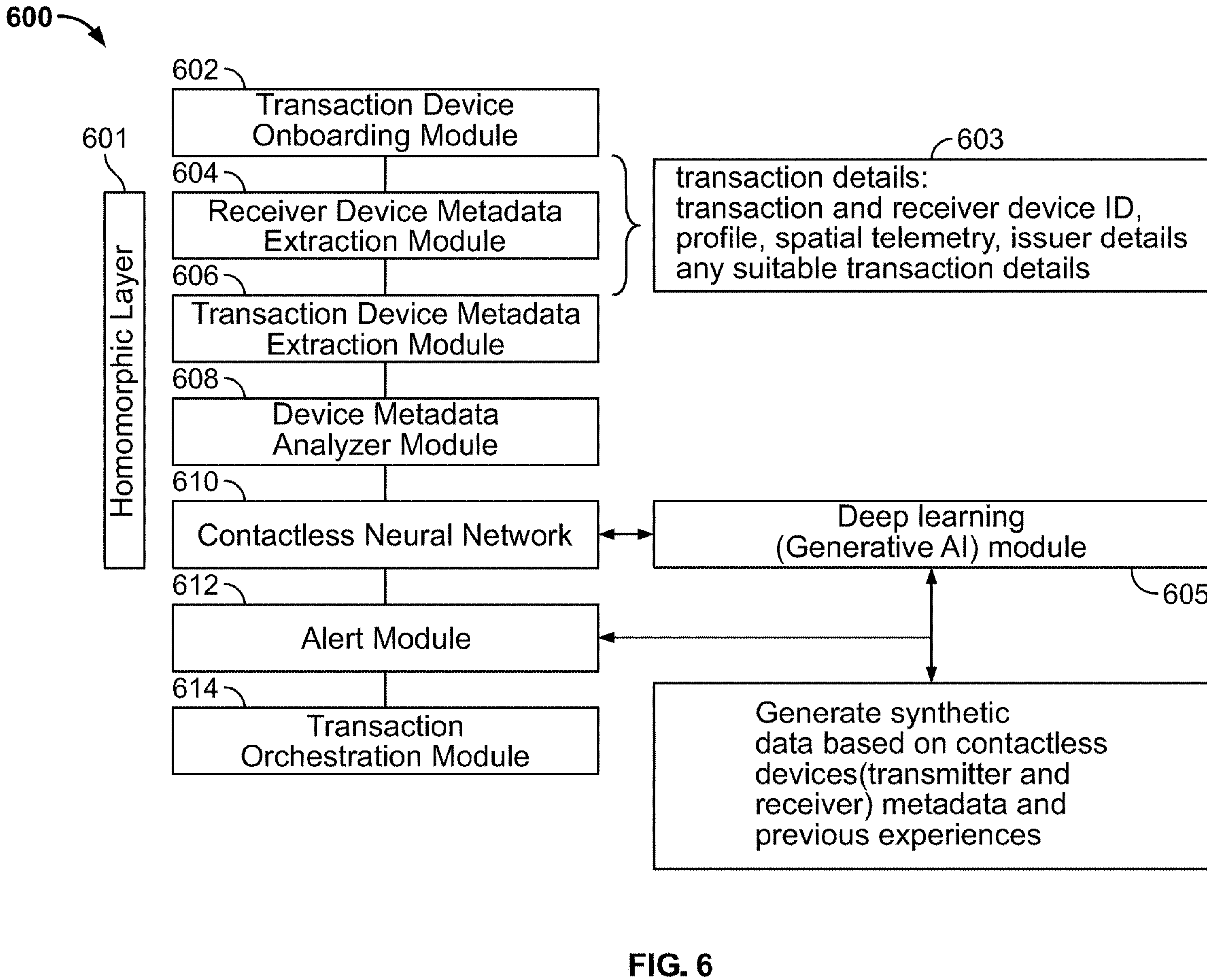
FIG. 6 shows yet another illustrative diagram in accordance with principles of the disclosure.

FIG. 6 shows illustrative architecture of transaction monitoring system 600. Transaction monitoring system 600 may have one or more features in common with one or more of transaction process 300, 400 and 500.

Transaction monitoring system 600 may include contactless device onboarding module 602. Contactless device onboarding module 602 may onboard a transaction device to transaction monitoring system 600.

Transaction monitoring system 600 may include homomorphic layer 601. Homomorphic layer 601 may include receiver device metadata extraction module 604, transaction device metadata extraction module 606, device metadata analyzer module 608 and contactless neural network 610.

In response to detecting a transaction between the onboarded transaction device and a receiver device, receiver device metadata extraction module 604 and transaction device metadata extraction module 606 may extract transaction details 603. Transaction details 603 may include transaction and receiver device identification ("ID"), profile, spatial telemetry, issuer details and any other suitable transaction details. Device metadata analyzer module 608 may analyze transaction details 603 extracted using receiver device metadata extraction module 604 and transaction device metadata extraction module 606. Device metadata analyzer module 608 may transmit analyzed transaction details 603 to contactless neural network 610. Contactless neural network 610 may be connected to deep learning module 605. Deep learning module 605 may generate synthetic data based on transaction details 603 and previous transaction experiences. Deep learning module 605 may use the synthetic data to detect whether the transaction is an illegitimate transaction.

Transaction monitoring system 600 may include alert module 612. In response to detecting an illegitimate transaction, alert module 612 may alert transaction device of the illegitimate transaction. Transaction monitoring system 600 may include transaction orchestration module 614. Transaction orchestration module 614 may prevent a transaction from occurring in response to an alert of an illegitimate transaction from alert module 612. Transaction orchestration module 614 may enable a transaction from occurring in response to a determination that the transaction is a legitimate transaction.

Figure 7:
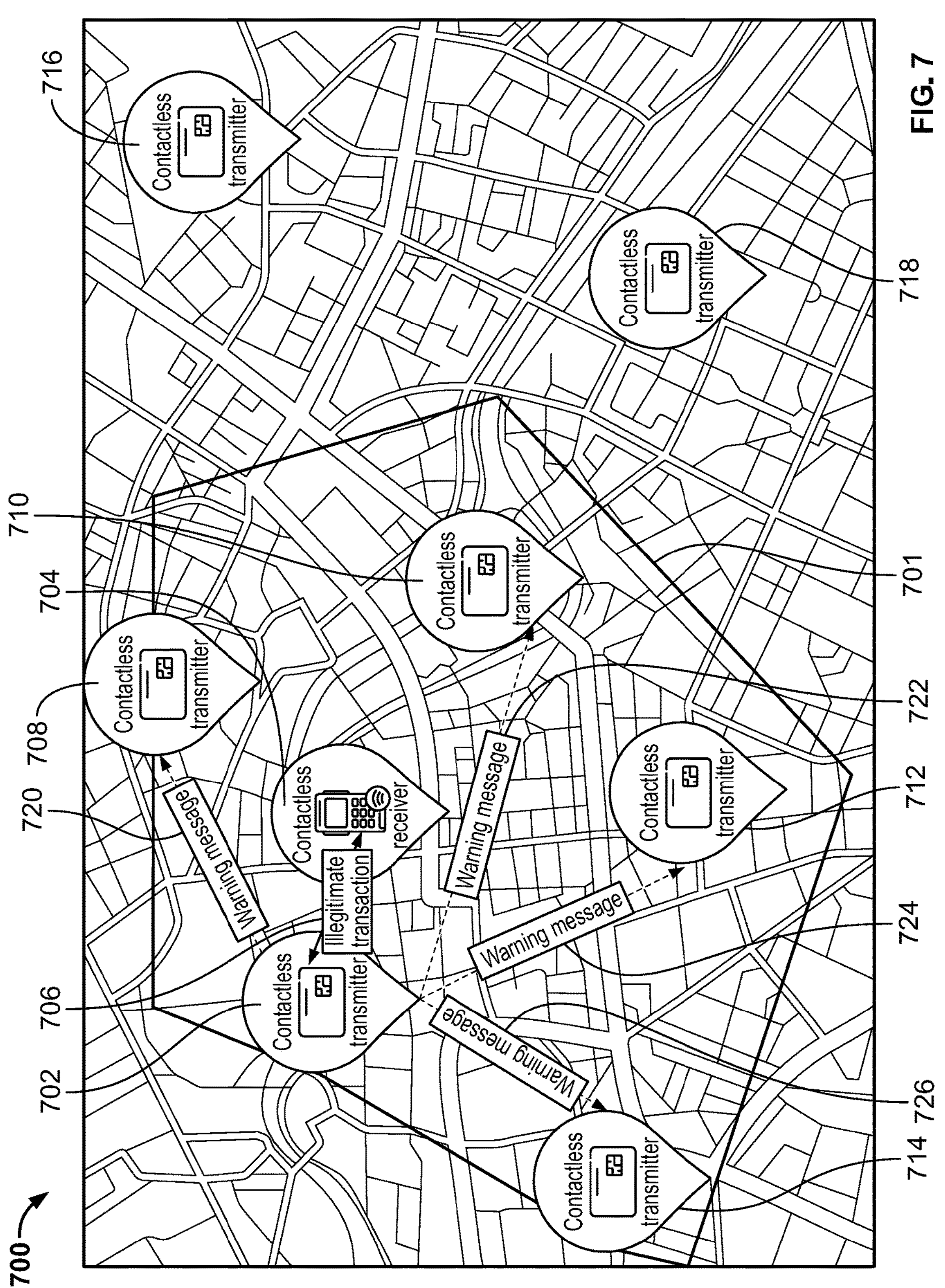
FIG. 7 shows yet another illustrative diagram in accordance with principles of the disclosure.

FIG. 7 shows illustrative notification process 700. Notification process 700 may include one or more features in common with transaction processes 300, 400 and 500. Notification process 700 may include illegitimate transaction 706. Illegitimate transaction 706 may be attempted between contactless transmitter 702 and contactless receiver 704. Contactless transmitter 702 may define geographic area 701. Contactless transmitter 702 may transmit to any other contactless transmitters identified in geographic area 701, a warning message, warning the transmitters that contactless receiver 704 is an illegitimate contactless receiver. Contactless transmitter 702 may transmit warning messages 720, 722, 724 and 726 to contactless transmitters 708, 710, 712 and 714, respectively. Contactless transmitters 716 and 718 may not be included in geographic area 701. Because contactless transmitters 716 and 718 are not included in geographic area 701, contactless transmitter 702 may not transmit a warning message to contactless transmitters 716 and 718.

Thus, methods and apparatus for CONTACTLESS TRANSACTION PROTECTION USING GENERATIVE ADVERSARIAL NETWORK ("GAN") DEEP LEARNING TECHNOLOGY are provided. Persons skilled in the art will appreciate that the present disclosure can be practiced by other than the described embodiments, which are presented for purposes of illustration rather than of limitation and that the present disclosure is limited only by the claims that follow.

What is claimed is:

1. A smart card including a contactless transmitter, the smart card configured to identify and suspend attempted transactions between the contactless transmitter and unauthorized contactless receivers, the smart card comprising:
- the contactless transmitter configured to transmit wireless signals; and
- an integrated circuit comprising a processing unit, the processing unit configured to provide processing capabilities to:
  - a generator module including artificial intelligence, the generator module configured to learn from previous transaction experience without instructional programming; and
  - a discriminator module including artificial intelligence, the discriminator module configured to learn from previous transaction experience without instructional programming;

wherein:
- the generator module is configured to, in response to receiving an attempted transaction, the attempted transaction occurring between the contactless transmitter and a contactless receiver, the contactless receiver not included in the smart card:
  - receive a transaction identifier packet from the contactless receiver, the transaction identifier packet including first data, the first data including identifying data associated with the contactless receiver;
  - retrieve a historical data packet including second data, the second data including determinations executed by the discriminator module that determined whether past attempted transactions were legitimate; and
  - generate, using artificial intelligence, a synthetic data model using a combination of the first and second data; and
- the discriminator module is configured to:
  - receive the synthetic data model;
  - connect to a knowledge graph, the knowledge graph configured to store third data, the third data including identifiers of authorized contactless receivers, the knowledge graph configured to be dynamically updated in real-time based on:
    - ongoing predictions being executed by a discriminator module on a second transaction device; and
    - current updates from an entity associated with the knowledge graph;
  - determine a comparison score based on a percentage of the synthetic data model that matches the third data stored in the knowledge graph;
  - execute, using artificial intelligence, a prediction whether the attempted transaction will be a legitimate transaction based on whether the comparison score is greater than a predetermined comparison score threshold value; and
  - transmit the prediction to the smart card;

wherein the smart card is further configured to:
- execute the attempted transaction in response to a prediction that the attempted transaction will be a legitimate transaction; and
- terminate the attempted transaction, in response to a prediction that the attempted transaction will be an illegitimate transaction;

wherein the discriminator module is further configured to:

transmit to the knowledge graph a transaction log relating to the attempted transaction, the transaction log including records of the transaction identifier packet, the prediction and a determination of whether the attempted transaction was legitimate;

store the transaction log at the knowledge graph; and update the third data stored in the knowledge graph based on the transaction log;

wherein the smart card further includes a transaction orchestration module configured to:

in response to determining that the attempted transaction is a legitimate transaction, automatically enable future transactions associated with the contactless receiver; and in response to determining that the attempted transaction is an illegitimate transaction, automatically disable the contactless transmitter from transmitting a signal to the contactless receiver.

2. The smart card of claim 1 wherein the generator module and the discriminator module comprise a generative adversarial network ("GAN").

3. The smart card of claim 1 the generator module further configured to continually train the discriminator module, wherein:

the generator module is configured to:

generate a first testing dataset, the first testing dataset including modified data from attempted transactions included in previous determinations; and transmit the first testing dataset to the discriminator module;

the discriminator module is configured to:

execute training predictions, the training predictions predicting whether the modified data included in the first training dataset will be real data or fake data; and transmit the training predictions to the generator module; and in response to a receipt of the training predictions from the discriminator module, the generator module is further configured to:

assign an accuracy score to the discriminator module based on an accuracy of the training predictions; and based on the accuracy score, dynamically generate a second testing dataset including modified data different from the modified data included in the first testing dataset to further train the discriminator module.

4. The smart card of claim 1 wherein:

the generator module is further configured to generate the synthetic data model using an alphanumeric pattern, the alphanumeric pattern generated using data from the transaction identifier packet and the historical data packet; and the discriminator module is configured to:

compare the alphanumeric pattern associated with the contactless receiver used for the attempted transaction with alphanumeric patterns corresponding to the authorized contactless receivers stored in the third data; and identify whether a transaction is legitimate based on if there is a match determined with the alphanumeric pattern of the contactless receiver and one of the alphanumeric patterns corresponding to the authorized contactless receivers.

5. The smart card of claim 1 wherein the attempted transaction between the contactless transmitter and the contactless receiver is a radio frequency identification ("RFID") transaction.

6. A method for identifying and suspending attempted transactions between contactless transmitters and unauthorized contactless receivers, the method including:

attempting a transaction between a contactless transmitter included in a smart card and a contactless receiver, the contactless receiver not included in the smart card;

in response to receiving notification of the attempted transaction, initiating, on the smart card, an identification session, the identification session including:

generating a synthetic data model at a generator module included in the smart card, the generator module including artificial intelligence, the generator module configured to learn from previous transaction experience without instructional programming, the generating using artificial intelligence, the generating including:

receiving a transaction identifier packet from the contactless receiver, the transaction identifier packet including first data, the first data including data identifying the contactless receiver;

retrieving a historical data packet including second data, the second data including determinations executed by a discriminator module that determined whether past attempted transactions were legitimate;

combining the first and second data to create the synthetic data model; and transmitting the synthetic data model to a discriminator module included in the smart card, the discriminator module including artificial intelligence, the discriminator module configured to learn from previous transaction experience without instructional programming; and executing a prediction, using the discriminator module, whether the attempted transaction will be a legitimate transaction, the executing using artificial intelligence, the executing including:

receiving the synthetic data model;

connecting to a knowledge graph, the knowledge graph configured to be dynamically updated in real-time based on ongoing predictions being executed by a discriminator module on a second transaction device and current updates from an entity associated with the knowledge graph, the knowledge graph configured to store third data, the third data including identifiers of authorized contactless receivers;

comparing the synthetic data model to the third data;

determining a comparison score based on a percentage of the synthetic data model that is identified to match the third data stored in the knowledge graph;

executing a prediction, the prediction predicting whether the attempted transaction will be a legitimate transaction based on whether the comparison score is greater than a predetermined comparison score threshold value; and transmitting the prediction to the generator module;

executing the transaction in response to a prediction that the transaction will be a legitimate transaction; and terminating the transaction, in response to a prediction that the transaction will be an illegitimate transaction;

wherein the method further comprises dynamically updating the knowledge graph by:

transmitting to the knowledge graph, from the discriminator module, a transaction log relating to the attempted transaction, the transaction log including records of the transaction identifier packet, the prediction and a determination of whether the transaction was legitimate;

storing the transaction log at the knowledge graph; and updating the third data stored in the knowledge graph based on the transaction log;

wherein, the smart card further includes a transaction orchestration module that based on the updating is configured to:

in response to determining that the attempted transaction is a legitimate transaction, automatically enable future transactions associated with the contactless receiver; and in response to determining that the attempted transaction is an illegitimate transaction, automatically disable the contactless transmitter from transmitting a signal to the contactless receiver.

7. The method of claim 6 wherein the generator module and the discriminator module, together:

comprise a generative adversarial network ("GAN") and are disposed on an integrated circuit ("IC").

8. The method of claim 6 further comprising continually training the discriminator module, the continual training including:

generating a first testing dataset, at the generator module, the first testing dataset including modified data from attempted transactions included in previous determinations;

transmitting the first testing dataset to the discriminator module;

executing training predictions, at the discriminator module, the training predictions predicting whether the data included in the first training dataset will be real data or fake data;

transmitting the training predictions to the generator module;

assigning an accuracy score to the discriminator module, based on a determined accuracy of the training predictions; and based on the accuracy score, dynamically generating a second testing dataset including modified data different from the modified data included in the first testing dataset, to further train the discriminator module.

9. The method of claim 6 further including:

generating the synthetic data model using an alphanumeric pattern, the generating using data included in the transaction identifier packet and the historical data packet;

comparing the alphanumeric pattern associated with the contactless receiver used in the attempted transaction with alphanumeric patterns corresponding to authorized contactless receivers stored in the third data; and identifying whether a transaction is legitimate based on if a match is determined between the alphanumeric pattern of the contactless receiver with one of the alphanumeric patterns corresponding to the authorized contactless receivers.

10. The method of claim 6 wherein the attempted transaction between the contactless transmitter and the contactless receiver is a radio frequency identification ("RFID") transaction.

11. A smart card including a contactless transmitter, the smart card configured to identify and suspend attempted transactions between the contactless transmitter and unauthorized contactless receivers, the smart card comprising:

the contactless transmitter configured to transmit wireless signals; and an integrated circuit comprising a processing unit, the processing unit configured to provide processing capabilities to:

a generator module including artificial intelligence, the generator module configured to learn from previous transaction experience without instructional programming; and a discriminator module including artificial intelligence, the discriminator module configured to learn from previous transaction experience without instructional programming;

wherein:

the generator module is configured to, in response to receiving an attempted transaction, the attempted transaction occurring between the contactless transmitter and a contactless receiver, the contactless receiver being a remote contactless server:

receive a transaction identifier packet from the contactless receiver, the transaction identifier packet including first data, the first data including identifying data associated with the contactless receiver;

retrieve a historical data packet including second data, the second data including determinations executed by the discriminator module that determined whether past attempted transactions were legitimate; and generate, using artificial intelligence, a synthetic data model using a combination of the first and second data; and the discriminator module is configured to:

receive the synthetic data model;

connect to a knowledge graph, the knowledge graph configured to store third data, the third data including identifiers of authorized contactless receivers, the knowledge graph configured to be dynamically updated in real-time based on:

ongoing predictions being executed by a discriminator module on a second transaction device; and current updates from an entity associated with the knowledge graph;

determine a comparison score based on a percentage of the synthetic data model that matches the third data stored in the knowledge graph;

execute a prediction, using artificial intelligence, whether the attempted transaction will be a legitimate transaction based on whether the comparison score is greater than a predetermined comparison score threshold value; and transmit the prediction to the smart card;

wherein, in response to a prediction that the attempted transaction will be an illegitimate transaction, the smart card further configured to:

terminate the attempted transaction; and transmit a warning message to transaction devices identified as being in proximity to the attempted transaction, the warning message identifying the contactless receiver as an illegitimate contactless receiver;

wherein the discriminator module is further configured to:

transmit to the knowledge graph a transaction log relating to the attempted transaction, the transaction log including records of the transaction identifier packet, the prediction and a determination of whether the attempted transaction was legitimate;

store the transaction log at the knowledge graph; and update the third data stored in the knowledge graph based on the transaction log;

wherein the smart card further includes a transaction orchestration module configured to:

in response to determining that the attempted transaction is a legitimate transaction, automatically enable future transactions associated with the contactless receiver; and in response to determining that the attempted transaction is an illegitimate transaction, automatically disable the contactless transmitter from transmitting a signal to the contactless receiver.

12. The smart card of claim 11 wherein the generator module and the discriminator module comprise a generative adversarial network ("GAN").

13. The smart card of claim 11 the generator module further configured to continually train the discriminator module, wherein:

the generator module is configured to:

generate a first testing dataset, the first testing dataset including modified data from attempted transactions included in previous determinations; and transmit the first testing dataset to the discriminator module;

the discriminator module is configured to:

execute training predictions, the training predictions predicting whether the modified data included in the first training dataset will be real data or fake data; and transmit the training predictions to the generator module; and in response to a receipt of the training predictions from the discriminator module, the generator module is further configured to:

assign an accuracy score to the discriminator module based on an accuracy of the training predictions; and based on the accuracy score, dynamically generate a second testing dataset including modified data different from the modified data included in the first testing dataset to further train the discriminator module.

14. The smart card of claim 11 wherein:

the generator module is further configured to generate the synthetic data model using an alphanumeric pattern, the alphanumeric pattern generated using data from the transaction identifier packet and the historical data packet; and the discriminator module is configured to:

compare the alphanumeric pattern associated with the contactless receiver used for the attempted transaction with alphanumeric patterns corresponding to the authorized contactless receivers stored in the third data; and identify whether a transaction is legitimate based on if there is a match determined with the alphanumeric pattern of the contactless receiver and one of the alphanumeric patterns corresponding to the authorized contactless receivers.

15. The smart card of claim 11 wherein the attempted transaction between the contactless transmitter and the contactless receiver is a radio frequency identification ("RFID") transaction.

* * * * *